No. 801,247. PATENTED OCT. 10, 1905
R. L. JOHNSON & W. W. ROBERTSON.
STALK BREAKER OR REDUCER.
APPLICATION FILED MAY 9, 1905.
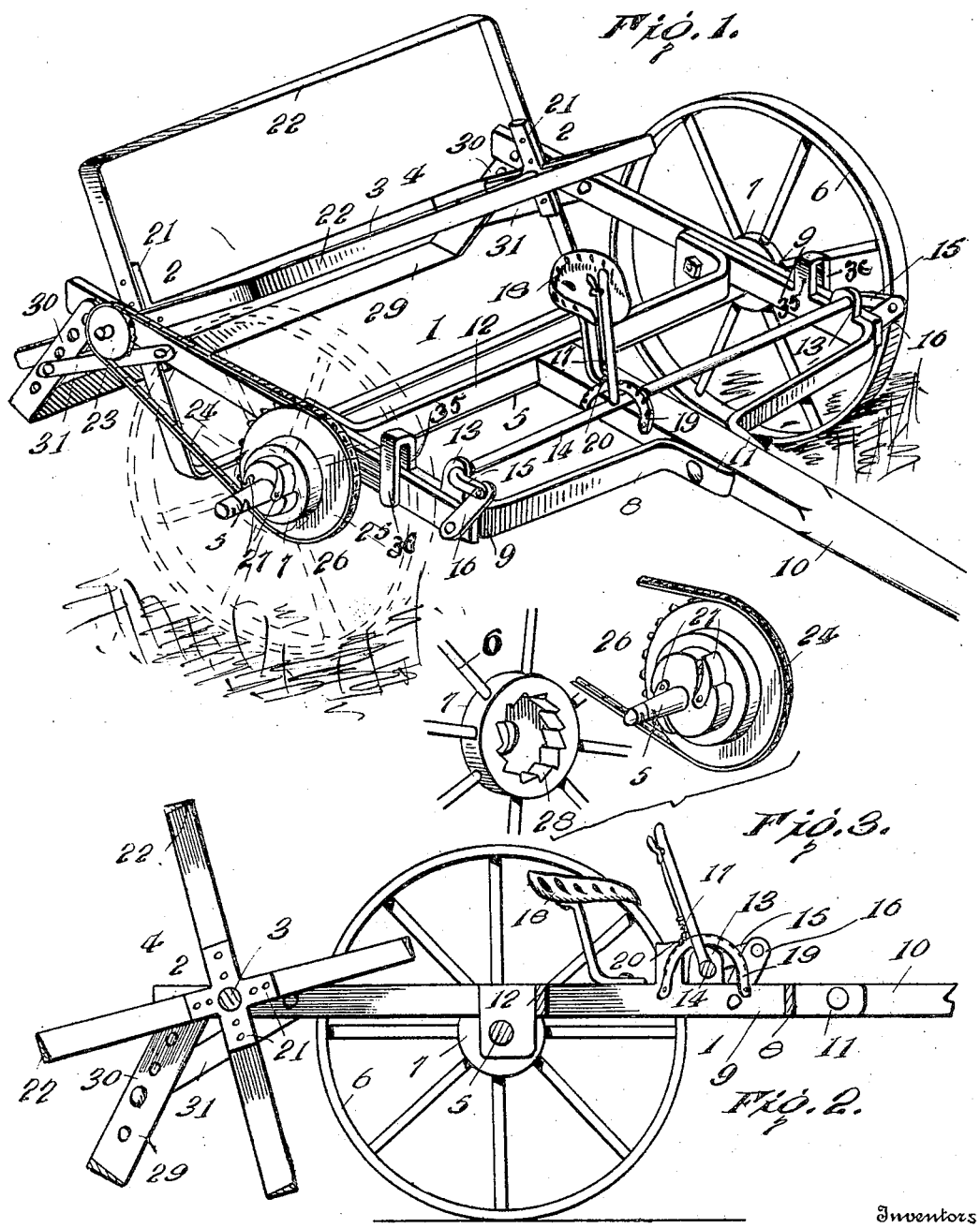
Witnesses
Inventors
R. L. Johnson
W. W. Robertson
By Attorneys

UNITED STATES PATENT OFFICE.

ROBERT L. JOHNSON AND WILLIAM W. ROBERTSON, OF LEWISVILLE, TEXAS.

STALK BREAKER OR REDUCER.

No. 801,247.   Specification of Letters Patent.   Patented Oct. 10, 1905.

Application filed May 9, 1905. Serial No. 259,642.

*To all whom it may concern:*

Be it known that we, ROBERT L. JOHNSON and WILLIAM W. ROBERTSON, citizens of the United States, residing at Lewisville, in the county of Denton and State of Texas, have invented certain new and useful Improvements in Stalk Breakers or Reducers, of which the following is a specification.

This invention comprises an implement for agricultural purposes designed particularly for breaking or reducing stalks, the same operating upon a somewhat similar principle as many of the stalk-cutters at present in use, but being of such a construction as to accomplish more effective results in reducing stalks as the machine is advanced over a field.

For a full description of the invention and the merits thereof and also to acquire a knowledge of the details of construction of the means for effecting the result reference is to be had to the following description and accompanying drawings, in which—

Figure 1 is a perspective view of an implement embodying the invention. Fig. 2 is a vertical sectional view. Fig. 3 is a perspective view showing more clearly the parts of the clutch or pawl-and-ratchet connection between the ground-wheels and the axle.

Corresponding and like parts are referred to in the following description and indicated in all the views of the drawings by the same reference characters.

In its general organization the invention embodies a cutter-frame 1, consisting of spaced longitudinal bars provided adjacent to the rear ends thereof with boxings 2, in which a shaft 3 is mounted, said shaft carrying the cutting-reel 4. The cutter-frame 1 is supported by an axle 5, carrying ground-wheels 6, the said axle 5 being mounted in boxings 7, supported by the rear end portion of a tongue-frame 8. The tongue-frame 8 consists of side bars 9, which are extended laterally toward each other by the front end portions and secured to the opposite sides of the tongue 10, as indicated at 11. The sides 9 of the tongue-frame 8 are connected by a transverse bar 12, and the rear end of the tongue 10 is likewise reinforced and secured to said bar 12. Plates 13 project upwardly from the sides 9 of the tongue-frame and are provided with suitable bearings in which a shaft 14 is mounted. The shaft 14 is provided at its ends with cranks 15, connected by links 16 with the front extremities of the side bars of the cutter-frame 1, and a lever 17 extends upwardly from the shaft 14 at a point about intermediate of its ends, so as to be convenient to the driver seated upon the seat 18. The lever 17 is adapted to be located in an adjusted position by means of a segment 19, secured to the tongue, and a latch 20 of any suitable type, carried by the lever for operation by the driver. The cutting-reel 4, carried by the shaft 3, consists of spiders 21, rigidly secured to the shaft, the blades 22 of the cutting-reel being secured to the arms of the spiders 21, as shown most clearly in the drawings. The number of the blades 22 will be varied according to the work desired to be performed by the implement, and each of the blades may be described to be of somewhat U form, being substantially attached to the spiders, as before referred to. The ends of the reel-shaft 3 extend outwardly from the sides of the frame 1, and sprocket-wheels 23 are mounted upon the extended end portions of said shaft, said wheels 23 being connected by sprocket-chains with sprocket-wheels 25, carried by the axle 5, upon which the ground-wheels are mounted. The sprocket-wheels 25 are provided with integral hub extensions 26, to which are pivoted the ratchet-pawls 27, and these pawls coöperate with ratchet-teeth 28 upon the ground-wheels 6, so that as the implement is advanced over the field the sprocket-wheels 25 will be rotated, transmitting motion to the shaft 3 by means of the sprocket-chains 24. When the implement is backed, however, the pawls 27 will ride over the ratchet-teeth 28 and the sprocket-wheels 25 will not be operated, the reel 4 remaining stationary. The cutting blades or knives 22 of the reel 4 coöperate with a stationary knife 29, provided with end extensions 30, which are directly connected with the rear extremities of the sides of the frame 1. The extensions 30 of the stationary knife 29 are suitably braced, as shown at 31, and are adapted to be adjustably connected with the frame 1, so that said knife 29 may be raised and lowered to adjust the same with relation to the rotating knives or blades 22 of the reel 4. It will be understood that any suitable means may be utilized to throw the reel into and out of operation within the contemplation of the invention.

In practice the reel 4 is provided with a casing or housing (not shown) to keep the stalks from being thrown in all directions under the cutting action of the reel 4 and the knife 29. It will be seen that the reel 4 and the knife 29 may be raised and lowered by operation of the lever 17, as the operator desires. By pulling the lever 17 rearwardly the shaft 14, by its connection with the cutter-frame, will raise the front portion thereof and lower the rear portion, and vice versa.

The general operation and advantages of the implement will be very apparent, and it will be seen that the action of the same in use will accomplish greater or more effective results than any of the cutting mechanisms employed for the same purposes now in use.

The side bars 9 of the tongue-frame are each provided with an upwardly-projecting engaging member 35, the upper extremity of which is formed with a hook or extension 36 to engage over the adjacent longitudinal bar of the cutter-frame 1. These members 35 positively hold the reel 2 down to its work when in operation and steady or reinforce the bars of the frame 1.

The longitudinal bars of the cutter-frame 1 are supported by the axle 5 by resting upon the upper side thereof. The axle forms a fulcrum for the bars of the cutter-frame on adjustment of the latter, and said bars are adapted to move vertically away from the axle should the cutter-reel strike an obstruction which resists the action thereof. The members 36, which project from the members 35, as above described, are carried by the forward end portions of the sides of the tongue-frame, and these members 36 by engaging with the longitudinal bars of the cutter-frame limit the upward movement of said longitudinal bars in a manner which will be evident.

Having thus described the invention, what is claimed as new is—

1. In a stalk-breaker, the combination of a supporting-axle, ground-wheels therefor, a tongue-frame embodying sides provided with boxings for the axle, a tongue extending from the tongue-frame, a cutter-frame embodying spaced longitudinal bars resting upon the upper side of the axle and movable vertically relative thereto, said axle forming a fulcrum for the longitudinal bars of the cutter-frame, means upon the tongue-frame for adjusting the cutter-frame, a cutting-reel carried by the cutter-frame and adjustable therewith, means for actuating the cutting-reel, and means carried by the tongue-frame adapted to engage the cutter-frame to limit the upward movement of the same with reference to the axle aforesaid.

2. In a stalk-breaker, the combination of a supporting-axle, ground-wheels therefor, a tongue-frame embodying sides provided with boxings for the axle, a cutter-frame arranged above the axle and normally resting thereon, said cutter-frame being movable vertically toward and from the axle and consisting of spaced longitudinal bars, a cutting-reel supported by the cutter-frame, a fixed knife mounted on the cutter-frame for coöperation with the reel, means carried by the tongue-frame and connected with the front ends of the longitudinal bars of the cutter-frame to adjust the cutter-frame, and engaging members projecting upwardly from the sides of the tongue-frame and provided with hooks or extensions adapted to engage over the front end portions of the longitudinal bars of the cutter-frame to limit the upward movement of said longitudinal bars, as specified.

In testimony whereof we affix our signatures in presence of two witnesses.

ROBERT L. JOHNSON. [L. S.]
WILLIAM W. ROBERTSON. [L. S.]

Witnesses:
J. B. SHETTON,
J. H. COBB.